(12) United States Patent
Robol et al.

(10) Patent No.: US 9,243,413 B2
(45) Date of Patent: Jan. 26, 2016

(54) DISCHARGE VACUUM RELIEF VALVE FOR SAFETY VACUUM RELEASE SYSTEM

(75) Inventors: Ronald B. Robol, Sanford, NC (US);
Daniel J. Hruby, Sanford, NC (US);
Johnathan S. Colvin, Cameron, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 1045 days.

(21) Appl. No.: 13/314,798

(22) Filed: Dec. 8, 2011

(65) Prior Publication Data

US 2012/0145251 A1 Jun. 14, 2012

Related U.S. Application Data (60) Provisional application No. 61/421,069, filed on Dec. 8, 2010.

(51) Int. Cl.
| | |
|---|---|
| *F16K 15/06* | (2006.01) |
| *F04D 15/02* | (2006.01) |
| *E04H 4/12* | (2006.01) |
| *E04H 4/16* | (2006.01) |
| *F04D 15/00* | (2006.01) |

(52) U.S. Cl.
CPC ............ *E04H 4/1245* (2013.01); *E04H 4/1645* (2013.01); *F04D 15/0077* (2013.01); *F04D 15/0083* (2013.01); *F04D 15/0218* (2013.01); *F16K 15/063* (2013.01); *C02F 2301/063* (2013.01); *Y10T 137/0396* (2015.04); *Y10T 137/2569* (2015.04); *Y10T 137/7897* (2015.04); *Y10T 137/86027* (2015.04)

(58) Field of Classification Search
CPC . C02F 2301/063; E04H 4/164; E04H 4/1245; E04H 4/1645; F04D 15/021; F04D 15/0077; F04D 15/0083; F04D 15/0218; F16K 15/063; Y10T 137/7897; Y10T 137/2569; Y10T 137/86027
USPC ............... 137/907, 526, 114, 565.11, 565.16, 137/113, 565.01, 565.3, 565.31; 4/504; 417/205, 306

See application file for complete search history.

(56) References Cited

U.S. PATENT DOCUMENTS

| | | |
|---|---|---|
| 1,061,919 A | 5/1913 | Miller |
| 2,238,597 A | 4/1941 | Page |
| 2,767,277 A | 12/1951 | Wirth |
| 3,191,935 A | 6/1965 | Uecker |
| 3,558,910 A | 1/1971 | Dale et al. |
| 3,581,895 A | 6/1971 | Howard et al. |
| 3,838,597 A | 10/1974 | Montgomery et al. |

(Continued)

FOREIGN PATENT DOCUMENTS

| | | |
|---|---|---|
| DE | 19736079 | 2/1999 |
| EP | 0246769 | 11/1987 |
| EP | 0833436 | 4/1998 |

*Primary Examiner* — Atif Chaudry
(74) *Attorney, Agent, or Firm* — Quarles & Brady LLP (57) ABSTRACT

Embodiments of the invention provide a pumping system and a discharge vacuum relief valve for use in a hydraulic system including a safety vacuum release system pump to circulate water in a swimming pool and/or a spa. The hydraulic system includes one or more check valves located on a discharge side of the safety vacuum release system pump. The discharge vacuum relief valve is capable of venting a vacuum at the discharge side of the safety vacuum release system pump during a vacuum event at a suction side of the safety vacuum release system pump.

15 Claims, 6 Drawing Sheets

(56) References Cited

U.S. PATENT DOCUMENTS

| | | | |
|---|---|---|---|
| 3,953,777 | A | 4/1976 | McKee |
| 3,963,375 | A | 6/1976 | Curtis |
| 4,021,700 | A | 5/1977 | Ellis-Anwyl |
| 4,123,792 | A | 10/1978 | Gephart et al. |
| 4,168,413 | A | 9/1979 | Halpine |
| 4,319,712 | A | 3/1982 | Bar |
| 4,370,098 | A | 1/1983 | McClain et al. |
| 4,402,094 | A | 9/1983 | Sanders |
| 4,419,625 | A | 12/1983 | Bejot et al. |
| 4,420,787 | A | 12/1983 | Tibbits et al. |
| 4,449,260 | A | 5/1984 | Whitaker |
| 4,998,097 | A | 3/1991 | Noth et al. |
| 5,079,784 | A | 1/1992 | Rist et al. |
| 5,100,298 | A | 3/1992 | Shibata et al. |
| RE33,874 | E | 4/1992 | Miller |
| 5,172,089 | A | 12/1992 | Wright et al. |
| 5,473,497 | A | 12/1995 | Beatty |
| 5,545,012 | A | 8/1996 | Anastos et al. |
| 5,550,753 | A | 8/1996 | Tompkins et al. |
| 5,570,481 | A | 11/1996 | Mathis et al. |
| 5,577,890 | A | 11/1996 | Nielsen et al. |
| 5,633,540 | A | 5/1997 | Moan |
| 5,682,624 | A | 11/1997 | Ciochetti |
| 5,690,476 | A | 11/1997 | Miller |
| 5,820,350 | A | 10/1998 | Mantey et al. |
| 5,833,437 | A | 11/1998 | Kurth et al. |
| 5,894,609 | A | 4/1999 | Barnett |
| 5,907,281 | A | 5/1999 | Miller, Jr. et al. |
| 5,930,092 | A | 7/1999 | Nystrom |
| 5,947,700 | A | 9/1999 | McKain et al. |
| 5,959,534 | A | 9/1999 | Campbell et al. |
| 5,991,939 | A | 11/1999 | Mulvey |
| 6,043,461 | A | 3/2000 | Holling et al. |
| 6,045,333 | A | 4/2000 | Breit |
| 6,059,536 | A | 5/2000 | Stingl |
| 6,098,654 | A | 8/2000 | Cohen et al. |
| 6,157,304 | A | 12/2000 | Bennett et al. |
| 6,171,073 | B1 * | 1/2001 | McKain .............. A61H 33/6073 |
| | | | 4/541.2 |
| 6,199,224 | B1 | 3/2001 | Versland |
| 6,238,188 | B1 | 5/2001 | Lifson |
| 6,342,841 | B1 | 1/2002 | Stingl |
| 6,354,805 | B1 | 3/2002 | Moller |
| 6,364,621 | B1 | 4/2002 | Yamauchi |
| 6,390,781 | B1 | 5/2002 | McDonough |
| 6,468,042 | B2 | 10/2002 | Moller |
| 6,468,052 | B2 | 10/2002 | McKain et al. |
| 6,501,629 | B1 | 12/2002 | Marriott |
| 6,504,338 | B1 | 1/2003 | Eichorn |
| 6,522,034 | B1 | 2/2003 | Nakayama |
| 6,534,940 | B2 | 3/2003 | Bell et al. |
| 6,534,947 | B2 | 3/2003 | Johnson et al. |
| 6,623,245 | B2 | 9/2003 | Meza et al. |
| 6,636,135 | B1 | 10/2003 | Vetter |
| 6,696,676 | B1 | 2/2004 | Graves et al. |
| 6,709,240 | B1 | 3/2004 | Schmalz et al. |
| 6,806,677 | B2 | 10/2004 | Kelly et al. |
| 6,875,961 | B1 | 4/2005 | Collins |
| 6,933,693 | B2 | 8/2005 | Schuchmann |
| 6,941,785 | B2 | 9/2005 | Haynes et al. |
| 6,965,815 | B1 | 11/2005 | Tompkins et al. |
| 6,976,052 | B2 | 12/2005 | Tompkins et al. |
| 7,117,120 | B2 | 10/2006 | Beck et al. |
| 7,931,447 | B2 | 4/2011 | Levin et al. |
| 2001/0002238 | A1 | 5/2001 | McKain et al. |
| 2002/0190687 | A1 | 12/2002 | Bell et al. |
| 2003/0099548 | A1 | 5/2003 | Meza et al. |
| 2003/0106147 | A1 | 6/2003 | Cohen et al. |
| 2004/0062658 | A1 | 4/2004 | Beck et al. |
| 2004/0090197 | A1 | 5/2004 | Schuchmann |
| 2006/0112480 | A1 * | 6/2006 | Sisk .......................... E04H 4/12 |
| | | | 4/507 |
| 2008/0095638 | A1 | 4/2008 | Branecky |
| 2008/0095639 | A1 | 4/2008 | Bartos et al. |
| 2008/0168599 | A1 | 7/2008 | Caudill et al. |
| 2009/0038696 | A1 * | 2/2009 | Levin et al. .............. 137/565.11 |
| 2009/0126806 | A1 * | 5/2009 | Hamza .......................... 137/511 |

* cited by examiner

DISCHARGE VACUUM RELIEF VALVE FOR SAFETY VACUUM RELEASE SYSTEM

RELATED APPLICATIONS

This application claims priority under 35 U.S.C. §119 to U.S. Provisional Patent Application No. 61/421,069 filed on Dec. 8, 2010, the entire contents of which are incorporated herein by reference.

BACKGROUND

In swimming pools and spas, safety vacuum release systems (SVRS) have been developed for the removal of suction in a line of the circulation system between the pump and a blocked outlet. SVRS devices can shut down the pump when a blockage is detected at a pool drain and the suction side of the pump in order to relieve suction and prevent body entrapment. If a check valve is installed on a discharge side of the circulation system, for example to prevent the backflow of water, it can also prevent or slow the relief of the suction. As a result, vacuum forces, such as those entrapping a swimmer against a drain of the swimming pool, may remain in place longer than current standards allow. In some swimming pools, the presence of a check valve can render an SVRS device ineffective.

SUMMARY

Some embodiments of the invention provide a pumping system and a discharge vacuum relief valve for use in a hydraulic system including a swimming pool and/or a spa. The hydraulic system includes a SVRS pump to circulate water in the swimming pool and the spa and one or more check valves located on a discharge side of the SVRS pump. The discharge vacuum relief valve is capable of venting a vacuum at the discharge side of the SVRS pump during a vacuum event at a suction side of the SVRS pump.

A method according to some embodiments of the invention provides discharge vacuum relief for a SVRS pump in a hydraulic system with discharge check valves. The method includes monitoring input power to the SVRS pump to detect a vacuum event on a suction side of the SVRS pump and shutting down the SVRS pump when the vacuum event is detected on the suction side in order to relieve the vacuum event. The method also includes monitoring pressure on a discharge side of the SVRS pump and venting the discharge side of the SVRS pump when a vacuum is detected on the discharge side to prevent delayed response time in relieving the vacuum event on the suction side.

Some embodiments of the invention provide a discharge vacuum relief valve kit to provide vacuum relief for a SVRS pump in a hydraulic system. The discharge vacuum relief valve kit includes a vacuum vent tube including a first end and a second end, a discharge vacuum relief valve coupled to the first end of the vacuum vent tube, and a vacuum vent screen coupled to the second end of the vacuum vent tube. The discharge vacuum relief valve is coupled to a drain plug opening of the SVRS pump.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a hydraulic system including a pump with a SVRS, discharge check valves, and a discharge vacuum relief valve. The discharge vacuum relief valve can help prevent a vacuum on a suction side of the hydraulic system from being transferred to a discharge side of the hydraulic system, affecting the discharge check valves and interfering with suction relief generated by the SVRS. As a result, the SVRS can react to suction events, such as body entrapment, virtually undisturbed by the presence of the discharge check valves.

Figure 1:
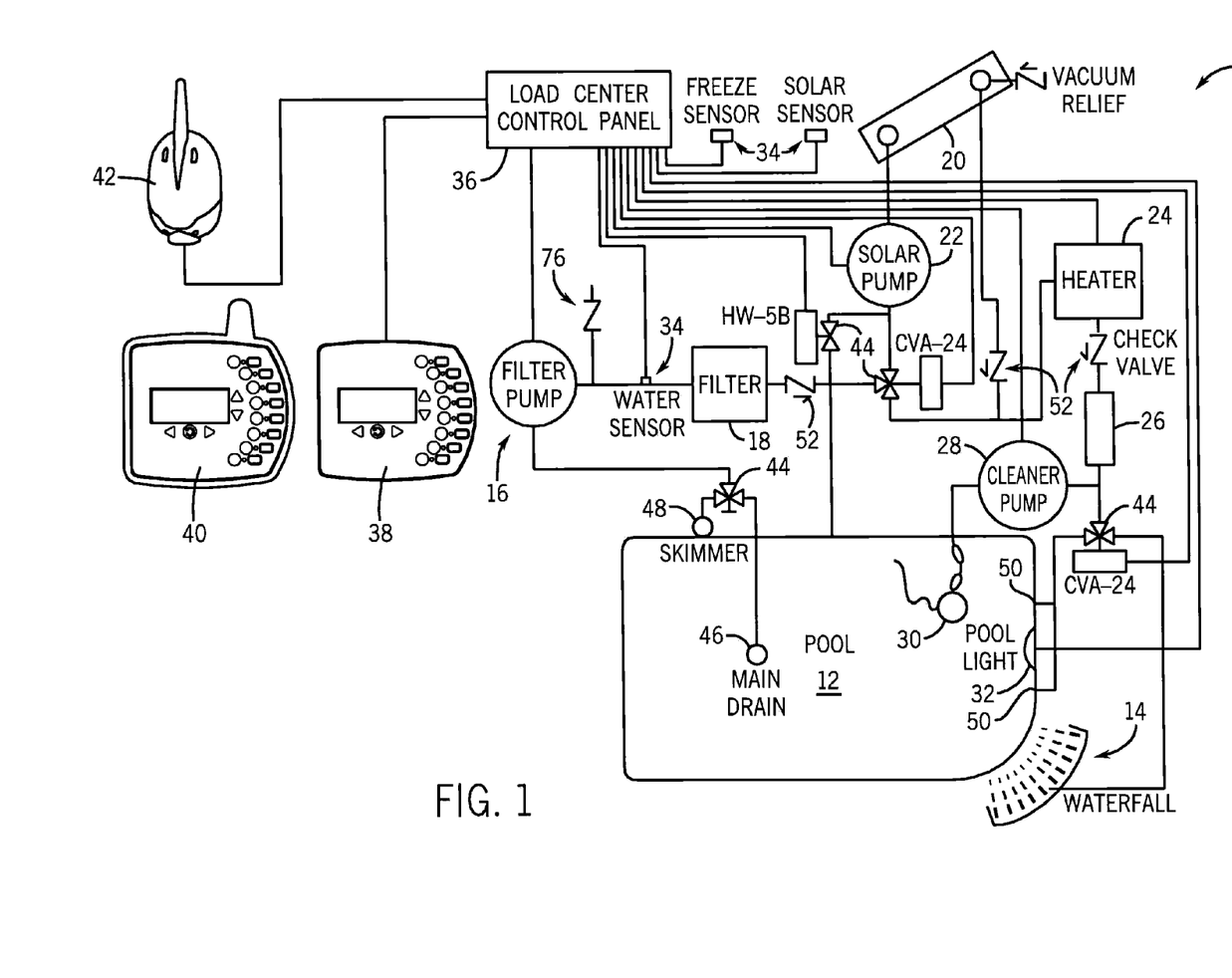
FIG. 1 is a schematic view of a hydraulic system with a discharge vacuum relief valve according to one embodiment of the invention.

FIG. 1 illustrates a hydraulic system 10 in which embodiments of the invention can be used. The hydraulic system 10 can include a swimming pool 12 and/or other water features, such as a waterfall 14. In some embodiments, the hydraulic system 10 can also include a spa (not shown). The hydraulic system 10 can include a main pump 16 and other components such as a filter 18, a solar heating system 20 with a solar pump 22, a heater 24, a chlorine generator 26, a cleaner pump 28 for a pool cleaner 30, a pool light 32, sensors 34, etc. A controller load center 36, including a wired control panel 38 and/or a wireless control panel 40 and a wireless transceiver 42, can control the components of the hydraulic system 10. In other embodiments, the hydraulic system 10 can include more or less components than those shown in FIG. 1.

Water can be directed through the hydraulic system 10 by the pumps 16, 22, 28 and a series of multi-port valves 44. For example, water can be drained from the swimming pool 12 through a main drain 46 and/or a skimmer 48, can be filtered, heated, and/or chlorinated, and then supplied back to the swimming pool 12 through the pool cleaner 30, discharge outlets 50, and/or the waterfall 14. The hydraulic system 10 can also include one or more discharge check valves 52 located at one or more locations along a discharge side of the hydraulic system 10 (e.g., on a discharge or pressure side of the main pump 16, as opposed to a supply or suction side). The discharge check valves 52 can prevent water from draining from the plumbing and equipment located on the discharge side of the hydraulic system 10. For example, the discharge check valve 52 between the heater 24 and the chlorine generator 26 can prevent the backflow of chlorine into the heater 24. In another example, the discharge check valve 52 between the solar heating system 20 and the heater 24 can prevent the backflow of water into the solar heating system 20 when it is not in use.

Figure 2:
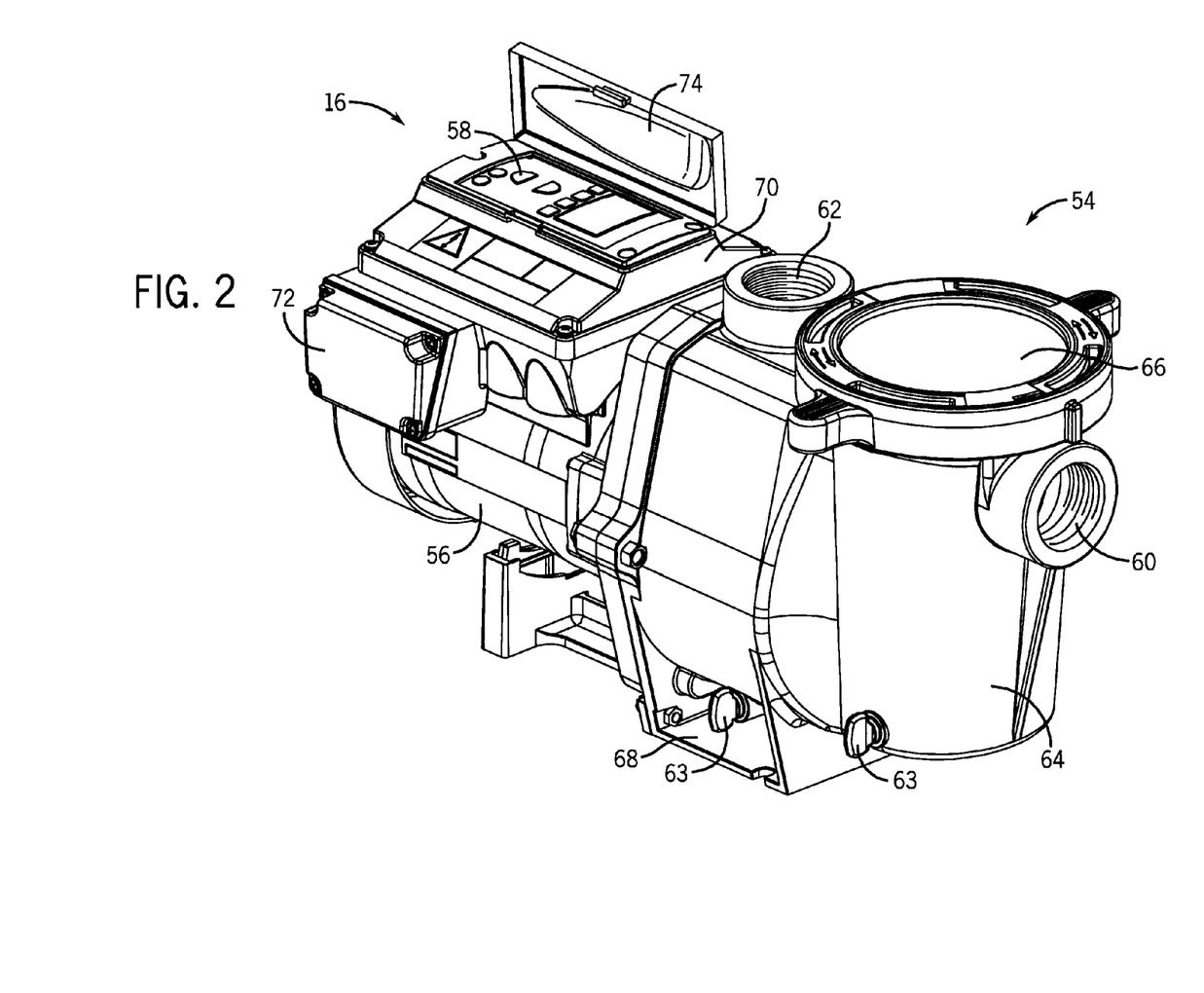
FIG. 2 is a perspective view of a safety vacuum release system (SVRS) pump for use with the system of FIG. 1.

In some embodiments, the main pump 16 can be a variable speed, SVRS (SVRS) pump, as shown in FIG. 2. The main pump 16 can include a housing 54, a variable speed motor 56, and an on-board controller 58. In one embodiment, the motor 56 can be driven at four or more different speeds. The housing 54 can include an inlet 60, an outlet 62, one or more drain plugs 63, a basket 64, a lid 66, and a stand 68. The stand 68 can support the motor 56 and can be used to mount the main pump 16 on a suitable surface (not shown).

In some embodiments, the on-board controller 58 can be enclosed in a case 70. The case 70 can include a field wiring compartment 72 and a cover 74. The cover 74 can be opened and closed to allow access to the on-board controller 58 and protect it from moisture, dust, and other environmental influences. The case 70 can be mounted on the motor 56. In some embodiments, the field wiring compartment 72 is capable of being coupled to a power supply to provide power to the motor 56 and the on-board controller 58.

In some embodiments, the motor 56 can include a coupling (not shown) to connect to the on-board controller 58. In some embodiments, the on-board controller 58 can automatically operate the main pump 16 according to at least one schedule. In some embodiments, the on-board controller 58 can allow a manual operation of the main pump 16. For example, in some embodiments, the on-board controller 58 can include a manual override. The manual override can interrupt the scheduled and/or manual operation of the main pump 16 to allow for, e.g., cleaning and maintenance procedures.

In some embodiments, the on-board controller 58 can monitor the operation of the main pump 16 and can indicate abnormal conditions of the main pump 16. For example, the on-board controller 58 (e.g., internal software of the on-board controller 58) can include the SVRS in order to stop or shut down the main pump 16 when a vacuum is detected (e.g., due to a blockage such as body entrapment) in order to relieve the vacuum. The SVRS can be used as a protective device to prevent a body entrapment event on suction fittings like the main drain 46 of the swimming pool 12 or a spa. In one embodiment, a vacuum event can be detected by monitoring changes in input power to the motor 56.

In conventional hydraulic systems, when discharge check valves are used in conjunction with a SVRS, they can reduce the reaction time on the SVRS to the point that the release system will not pass the closure times required by pool operating standards and regulations (i.e., the discharge check valves can slow the response time of the SVRS). For example, a typical body entrapment event causes a vacuum level on the suction side of the system to increase very quickly. That vacuum can transfer into the pressure side of the system (i.e., the discharge side) and, when the system is equipped with discharge check valves, that vacuum can increase the sealing force on the discharge check valves and delay the SVRS from recognizing the presence of the body entrapment event and shutting down the pump to relieve the vacuum.

In some embodiments, as shown in FIGS. 1 and 3-7C, the hydraulic system 10 can include a discharge vacuum relief valve 76. The discharge vacuum relief valve 76 can allow the SVRS to function normally despite use of the discharge check valves 52 in the hydraulic system 10. The discharge vacuum relief valve 76 can be a vacuum sensing valve (e.g., a spring-loaded check valve) positioned on the discharge side of the hydraulic system 10. When the discharge vacuum relief valve 76 recognizes a vacuum level, it can open (i.e., provide a vent) in order to let air into the discharge side of the main pump 16, preventing the vacuum from transferring over to the discharge side and delaying detection by the SVRS of the main pump 16. As a result, the SVRS can react undisturbed by the presence of the discharge check valves 52 in the hydraulic system 10.

Figure 3:
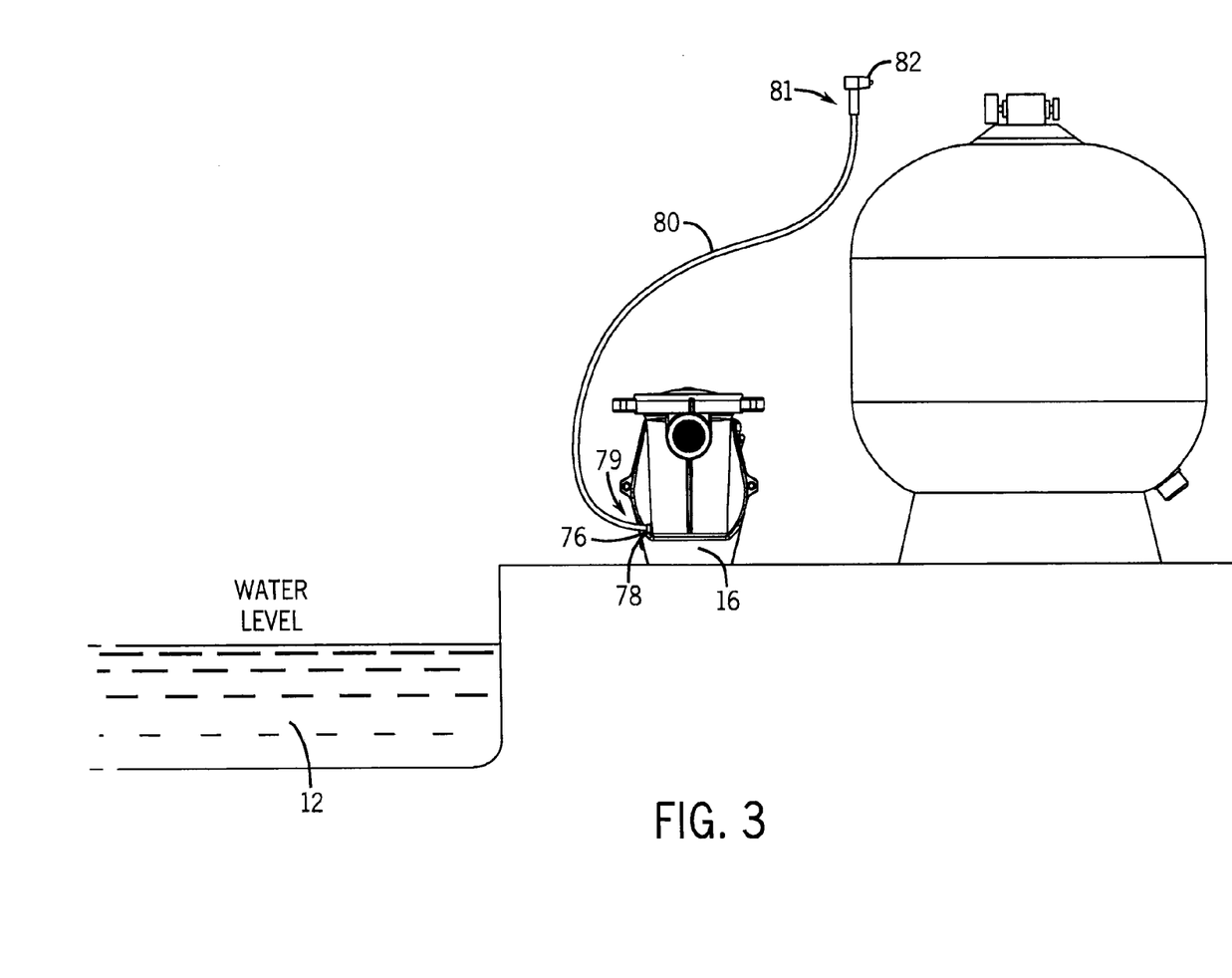
FIG. 3 is a schematic view of a discharge vacuum relief valve kit coupled to a SVRS pump according to one embodiment of the invention.
Figure 4:
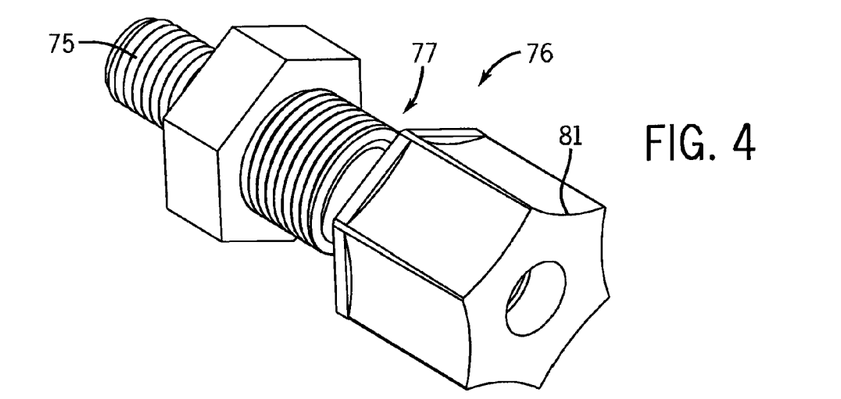
FIG. 4 is a perspective view of a discharge vacuum relief valve according to one embodiment of the invention.
Figure 5:
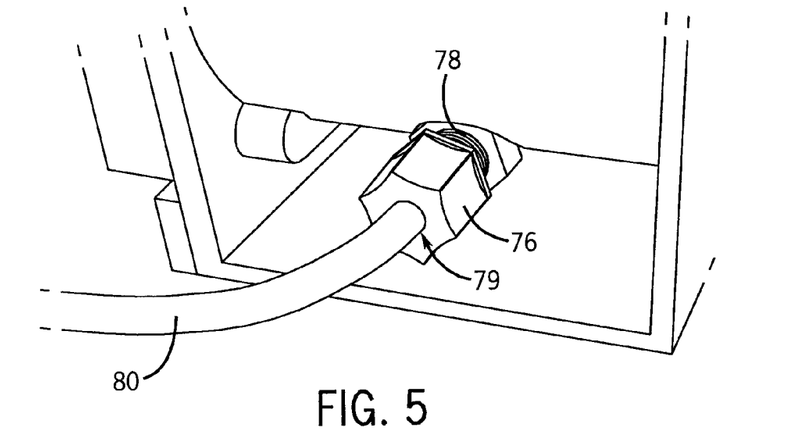
FIG. 5 is a partial perspective view of the discharge vacuum relief valve of FIG. 4 coupled to a SVRS pump.
Figure 6:
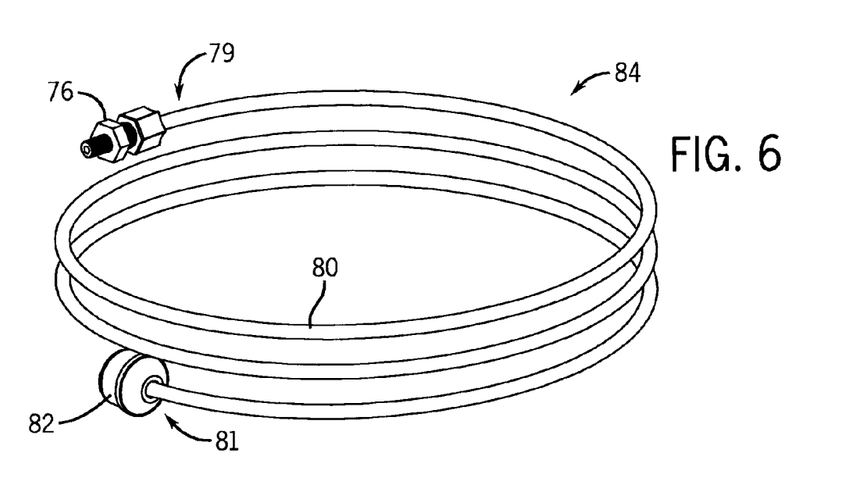
FIG. 6 is a discharge vacuum relief valve kit according to one embodiment of the invention.
Figure 7A:
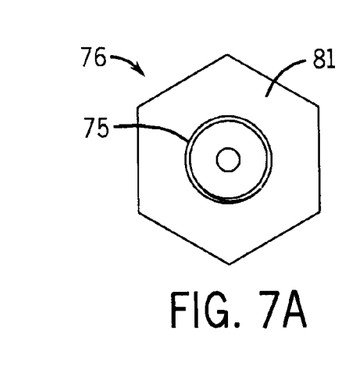
FIGS. 7A-7C are front, side, and rear views, respectively, and example dimensions of a discharge vacuum relief valve for use with the discharge vacuum relief valve kit of FIG. 6.
Figure 7B:
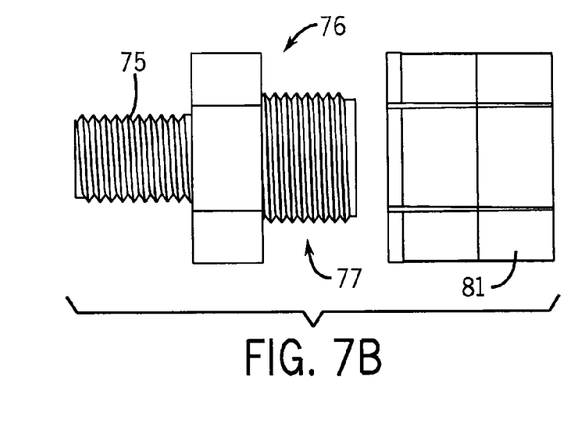
Figure 7C:
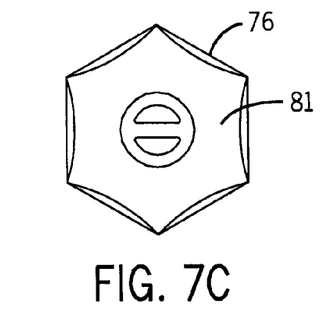

In some embodiments as shown in FIGS. 3 and 5, the discharge vacuum relief valve 76 can be coupled to a drain plug opening 78 of the main pump 16 (e.g., by removing one of the drain plugs 63). The drain plug opening 78 and the discharge vacuum relief valve 76 can be coupled together via threading on the drain plug opening 78 and threading 75 (as shown in FIGS. 4 and 7B) on the discharge vacuum relief valve 76. As shown in FIGS. 3, 5, and 6, a vacuum vent tube 80 can be coupled to an end 77 of the discharge vacuum relief valve 76 by a compression fit (e.g., with a compression fitting such as a collar 81, a metal ring, a sleeve, or another suitable fitting). The vacuum vent tube 80 can be routed upward from its first end 79 coupled to the discharge vacuum relief valve 76 so that its second, free end 81 is above all bodies of water connected to the main pump 16, as shown in FIG. 3, or at least so that its free end 81 is above a maximum water level in all bodies of water in the hydraulic system 10. In addition, a vacuum vent screen 82 can be coupled to the free end 81 of the vacuum vent tube 80 to protect the discharge vacuum relief valve 76 and the vacuum vent tube 80 from dirt, insects, and other contaminants that could interfere with operation of the discharge vacuum relief valve 76.

Figure 8A:
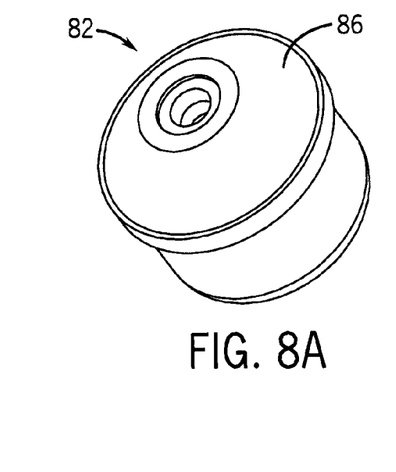
FIGS. 8A-8C are perspective, side, and rear views, respectively, and example dimensions of a vacuum vent screen for use with the discharge vacuum relief valve kit of FIG. 6.
Figure 8B:
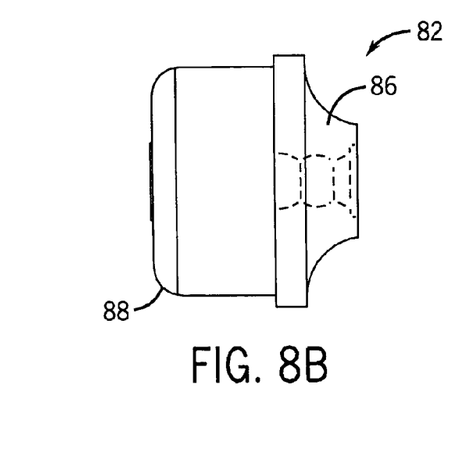
Figure 8C:
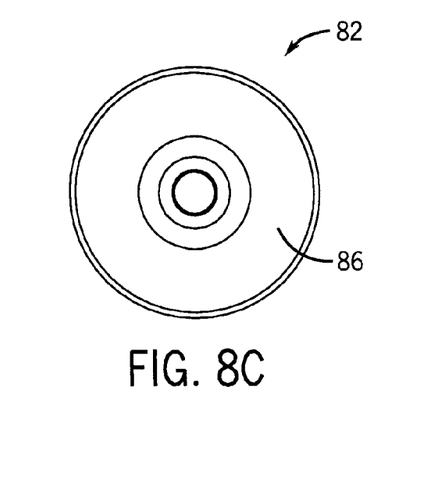

In some embodiments, as shown in FIG. 6, the discharge vacuum relief valve 76, the vacuum vent tube 80, and the vacuum vent screen 82 can be provided as a discharge vacuum relief kit 84 to be coupled to a SVRS pump 16 being installed in existing hydraulic systems 10 with discharge check valves 52. For example, in discharge vacuum relief kit 84 of FIG. 6, the vacuum vent tube 80 can be a ⅜-inch thick tube, the vacuum relief valve can include the dimensions shown in FIGS. 7A and 7C, and the vacuum vent screen 82 can include the dimensions shown in FIGS. 8B and 8C. In one embodiment, the vacuum vent screen 82 can include a polyvinyl chloride (PVC) base 86 and a stainless steel mesh screen 88.

In some embodiments, characteristics of the discharge vacuum relief valve 76, such as allowed air flow (e.g., in cubic feet per minute) and pressure rating (e.g., in pounds per square inch) can be selected based on the type of swimming pool and/or spa application or, more generally, on the types of bodies of water in the hydraulic system 10. In one embodiment, the discharge vacuum relief valve 76 can have a pressure vent rating of about 1.5 pounds per square inch.

Figure 9A:
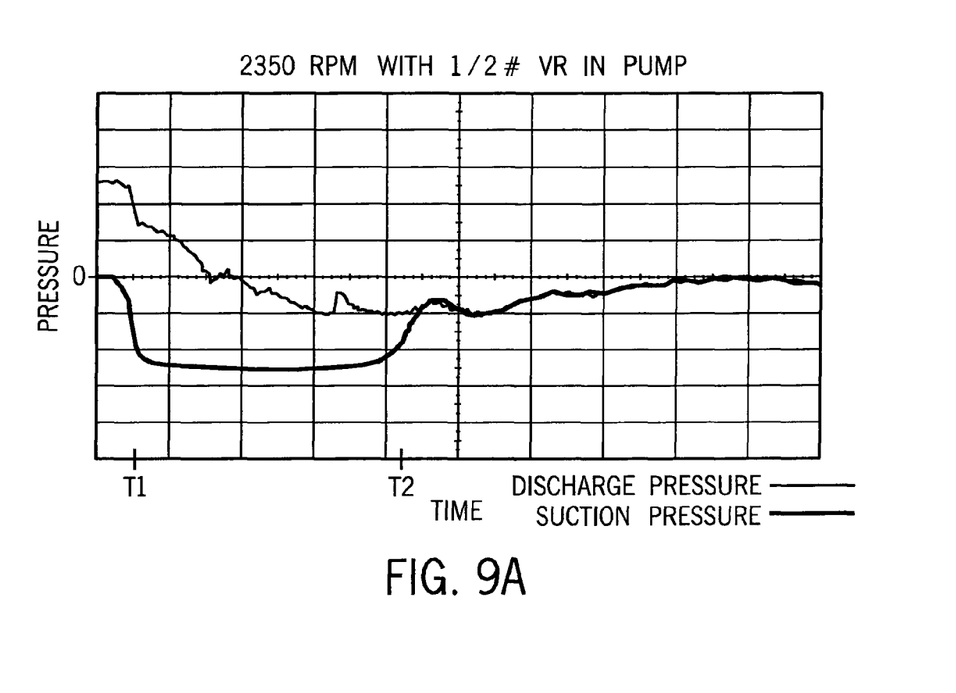
FIGS. 9A and 9B are graphs illustrating time and pressure measurements of a SVRS pump with a discharge vacuum relief valve, in accordance with one embodiment of the invention, and a pump without a discharge vacuum relief valve, respectively.
Figure 9B:
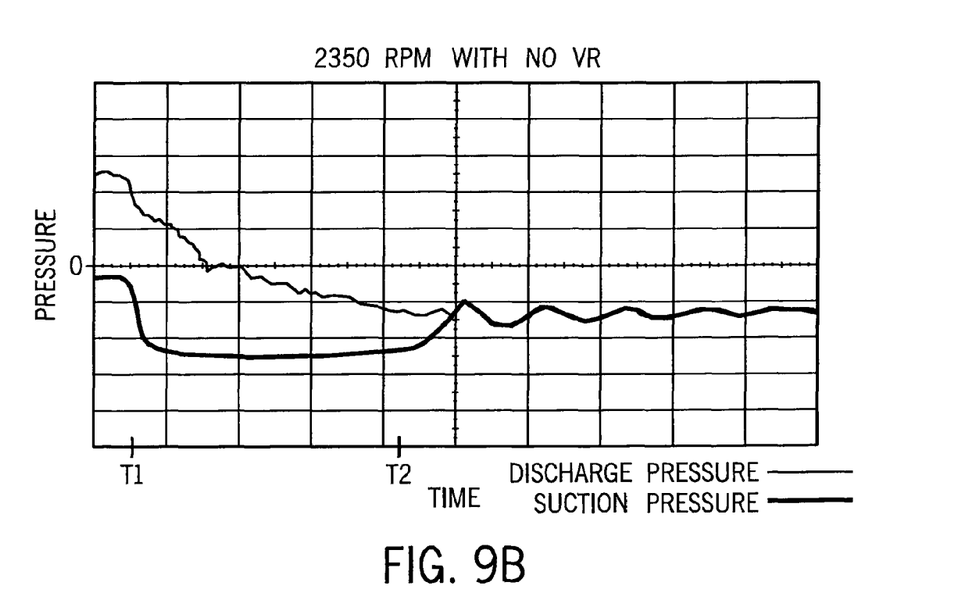

FIGS. 9A and 9B illustrate discharge pressure and vacuum pressure measured in a SVRS pump 16 with a discharge vacuum relief valve 76 and a SVRS pump without a discharge vacuum relief valve, respectively. As shown in FIGS. 9A and 9B, a vacuum event occurs at time T1, causing both the suction pressure and the discharge pressure to drop. As shown in FIG. 9A, the discharge vacuum relief valve 76 is triggered (i.e., around time T2), relieving the vacuum and causing both the discharge pressure and the suction pressure to ramp upward to about zero. As shown in FIG. 9B, without the presence of the discharge vacuum relieve valve 76, both the discharge pressure and the suction pressure continue to stay in a vacuum state (i.e., are maintained at negative pressures).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pumping system for use with a hydraulic system include at least one of a swimming pool and a spa, the pumping system comprising:
   a safety vacuum release system pump to circulate water in one of the swimming pool and the spa;
   at least one check valve located on a discharge side of the safety vacuum release system pump; and
   a discharge vacuum relief valve capable of venting a vacuum at the discharge side of the safety vacuum release system pump during a vacuum event at a suction side of the safety vacuum release system pump.

2. The pumping system of claim 1, wherein the safety vacuum release system pump includes an on-board controller capable of detecting the vacuum event and the discharge vacuum relief valve prevents delayed detection of the vacuum event due to the presence of the at least one check valve.

3. The pumping system of claim 1, wherein the discharge vacuum relief valve is positioned on the discharge side of the safety vacuum release system pump.

4. The pumping system of claim 1, wherein the safety vacuum release system pump includes a drain plug opening, and the discharge vacuum relief valve is coupled to the drain plug opening.

5. The pumping system of claim 1, wherein the discharge vacuum relief valve is a spring-loaded check valve.

6. The pumping system of claim 1 and further comprising a vacuum vent tube, a first end of the vacuum vent tube coupled to the discharge vacuum relief valve and a second end of the vacuum vent tube positioned to be above a water level of one of the swimming pool and the spa.

7. The pumping system of claim 6 and further comprising a vacuum vent screen positioned over the second end of the vacuum vent tube.

8. The pumping system of claim 1, wherein a drain of one of the swimming pool and the spa is coupled to the suction side of the safety vacuum release system pump.

9. The pumping system of claim 1, wherein the pressure vent rating of the discharge vacuum relief valve is about 1.5 pounds per square inch.

10. A method of providing discharge vacuum relief for a safety vacuum release system pump in a hydraulic system with discharge check valves, the method comprising:
    monitoring input power to the safety vacuum release system pump to detect a vacuum event on a suction side of the safety vacuum release system pump;
    shutting down the safety vacuum release system pump when the vacuum event is detected on the suction side in order to relieve the vacuum event;
    monitoring pressure on a discharge side of the safety vacuum release system pump; and
    venting the discharge side of the safety vacuum release system pump when a vacuum is detected on the discharge side to prevent delayed response time in relieving the vacuum event on the suction side.

11. The method of claim 10 and further comprising detecting a vacuum on the discharge side when the monitored pressure is about 1.5 pounds per square inch.

12. The method of claim 10 and further comprising monitoring the pressure with a discharge vacuum relief valve and opening the discharge vacuum relief valve when the vacuum is detected in order to vent the discharge side.

13. The method of claim 12 and further comprising providing a vacuum vent tube coupled to the discharge vacuum relieve valve and positioning a free end of the vacuum vent tube above all bodies of water in the hydraulic system.

14. The method of claim 12 and further comprising coupling the discharge vacuum relief valve to a drain plug opening of the safety vacuum release system pump.

15. The method of claim 10, wherein the step of monitoring at least input power to the safety vacuum release system pump to detect a vacuum event includes monitoring a change in input power.

* * * * *